(12) United States Patent
Yamashita et al.

(10) Patent No.: US 11,431,032 B2
(45) Date of Patent: Aug. 30, 2022

(54) METHOD FOR MANUFACTURING MONO CELL

(71) Applicant: Envision AESC Japan Ltd., Zama (JP)

(72) Inventors: Takeshi Yamashita, Kanagawa (JP); Kenichi Shirai, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 417 days.

(21) Appl. No.: 16/479,180

(22) PCT Filed: Jan. 20, 2017

(86) PCT No.: PCT/JP2017/001902
§ 371 (c)(1),
(2) Date: Sep. 11, 2019

(87) PCT Pub. No.: WO2018/134961
PCT Pub. Date: Jul. 26, 2018

(65) Prior Publication Data
US 2020/0136189 A1   Apr. 30, 2020

(51) Int. Cl.
*H01M 10/0585* (2010.01)
*H01M 50/46* (2021.01)
*H01M 4/02* (2006.01)

(52) U.S. Cl.
CPC ..... *H01M 10/0585* (2013.01); *H01M 50/461* (2021.01); *H01M 2004/027* (2013.01); *H01M 2004/028* (2013.01); *Y02P 70/50* (2015.11)

(58) Field of Classification Search
CPC ........... H01M 10/0585; H01M 50/461; H01M 2004/027; H01M 2004/028
(Continued)

(56) References Cited

U.S. PATENT DOCUMENTS

2012/0189895 A1   7/2012   Gutsch et al.
2014/0377631 A1   12/2014  Park et al.

FOREIGN PATENT DOCUMENTS

DE   102009013345 A1   9/2010
JP   2002015773 A      1/2002
(Continued)

OTHER PUBLICATIONS

English translation of JP 2014-120456 A (Year: 2014).*
English translation JP 2013-187021 A (Year: 2013).*

*Primary Examiner* — Bethany L Martin
*Assistant Examiner* — Kourtney R S Carlson
(74) *Attorney, Agent, or Firm* — Young Basile Hanlon & MacFarlane, P.C.

(57) ABSTRACT

Provided is a method for manufacturing a mono cell having a sheet-like negative electrode, a sheet-like separator and a sheet-like positive electrode laminated in this order. In this manufacturing method, adhesives are disposed at a plurality of points on an upper surface of the negative electrode, then, the negative electrode is bonded to a lower surface of the separator, and furthermore, adhesives are disposed at a plurality of points on a lower surface of the positive electrode, then the positive electrode is bonded to an upper surface of the separator. When viewed in the lamination direction of the mono cell, the positions of the adhesives and the positions of the adhesives do not overlap each other. Then, adhesives are disposed at a plurality of points on an upper surface of the positive electrode, and a lower surface of a separator is bonded to the upper surface of the positive electrode.

5 Claims, 4 Drawing Sheets

(58) Field of Classification Search
USPC .......................................................... 429/129
See application file for complete search history.

(56) References Cited

FOREIGN PATENT DOCUMENTS

| | | | | |
|---|---|---|---|---|
| JP | 2007299855 A | | 11/2007 | |
| JP | 2013187021 A | * | 9/2013 | |
| JP | 2014120456 A | | 6/2014 | |
| JP | 2015529957 A | | 10/2015 | |
| KR | 2012-0007508 A | | 1/2012 | |
| WO | WO-02095858 A1 | * | 11/2002 | .......... H01M 10/052 |

* cited by examiner

METHOD FOR MANUFACTURING MONO CELL

TECHNICAL FIELD

The present invention relates to a method for manufacturing a mono cell in which a sheet-like separator is disposed between sheet-like positive and negative electrodes.

BACKGROUND

As one example of a radical unit formed by disposing a sheet-like separator between a sheet-like positive electrode and a sheet-like negative electrode, one described in Japanese Patent Application Publication 2015-529957 can be sited. In the radical unit of Japanese Patent Application Publication 2015-529957, the bonding between the positive electrode and the separator and the bonding between the negative electrode and the separator are carried out by disposing adhesive over an bonding surface in, for example, a mesh shape.

In a state in which the adhesive is disposed in such a way, when viewed in the lamination direction of the radical unit, a part at which the position of the adhesive between the positive electrode and the separator overlaps the position of the adhesive between the negative electrode and the separator, that is, a part at which adhesive is applied to both sides of the separator exists. Therefore there is the fear that the thickness of the radical unit becomes excessively large.

The present invention has been made in a consideration of such a problem, and an object of the present invention is to provide a method for manufacturing a mono cell with which an increase in the thickness of a mono cell caused by adhesive is suppressed.

SUMMARY

The present invention is one in which, in a method for manufacturing a mono cell in which a sheet-like separator is disposed between sheet-like positive and negative electrodes, when viewed in a lamination direction of the mono cell, adhesives are disposed such that adhesives on one surface of the separator do not overlap adhesives on the other surface of the separator.

According to the present invention, the adhesives are not disposed at the same positions on both of the surfaces of the separator, and consequently, the thickness of the mono cell does not excessively increase.

DETAILED DESCRIPTION

In the following, one embodiment of the present invention will be explained with reference to the drawings.

Figure 1:
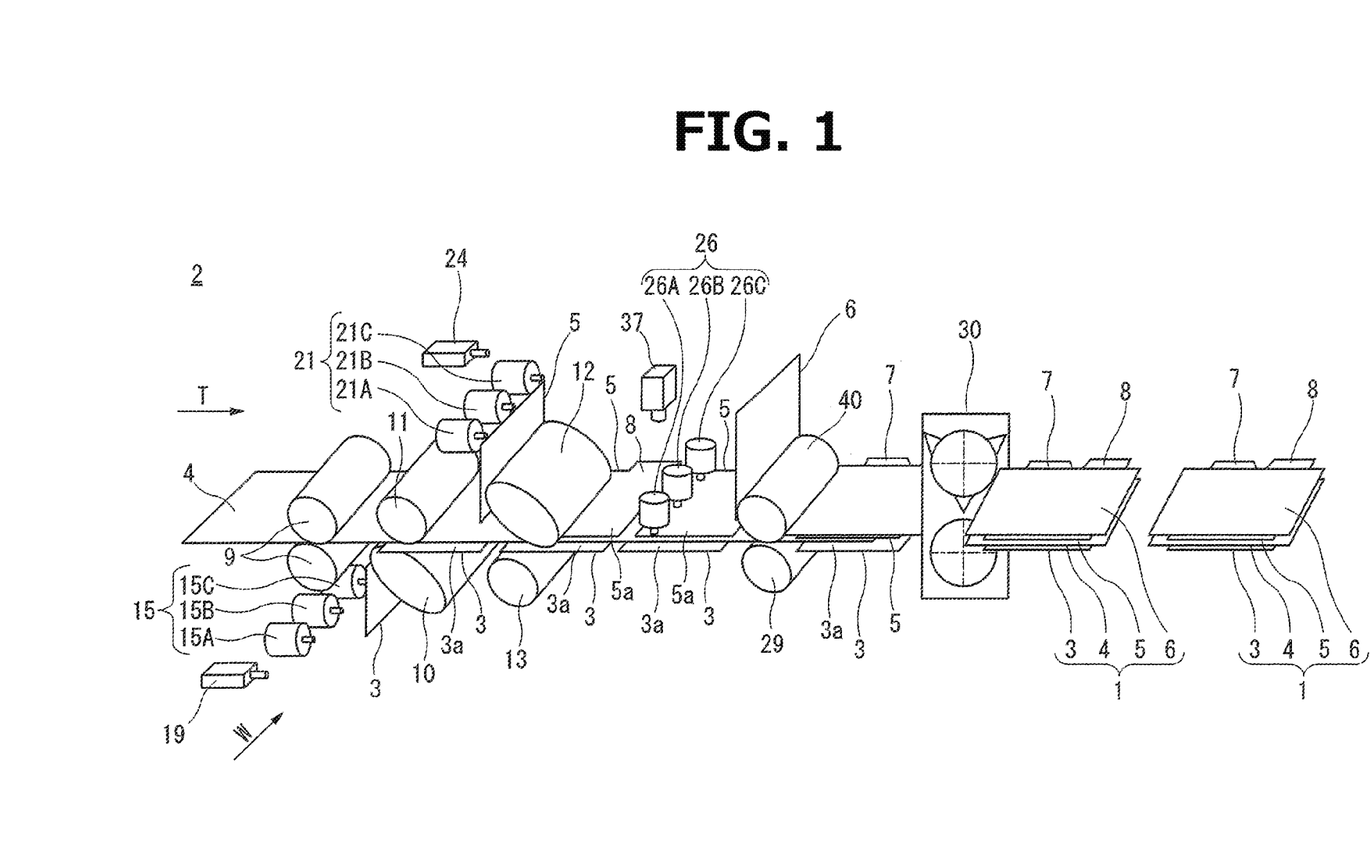
FIG. 1 is a perspective view of an electrode lamination device of one embodiment.
Figure 2:
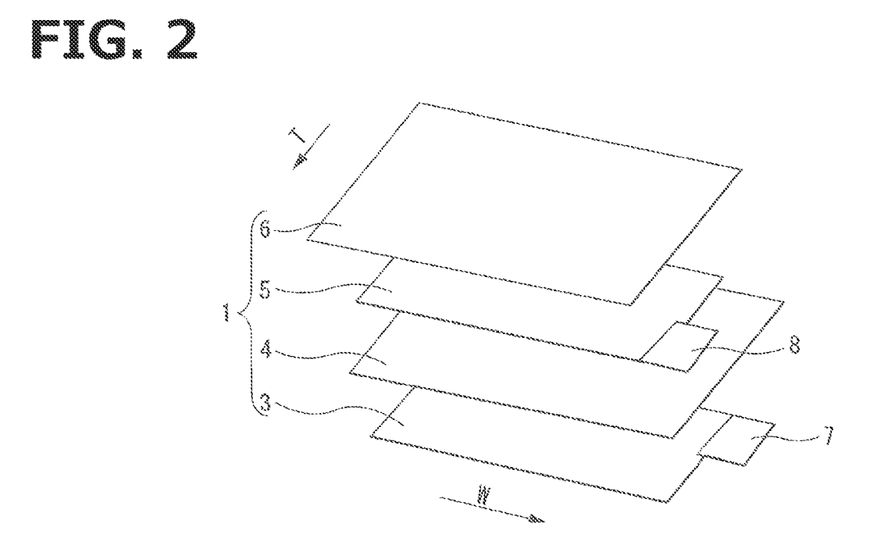
FIG. 2 is a perspective view of a mono cell.
Figure 3:
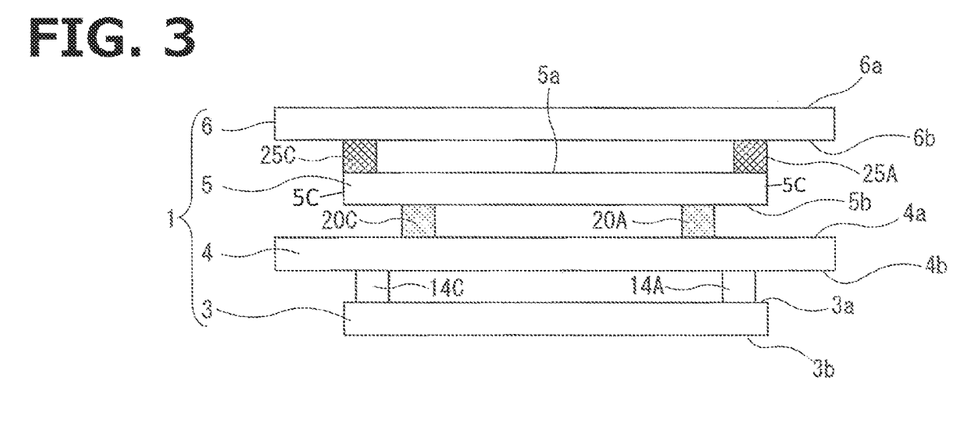
FIG. 3 is a side view of the mono cell.

In FIG. 1, an electrode lamination device 2 for manufacturing a mono cell (unit laminated body) 1 is shown. For example, as shown in FIG. 2 and FIG. 3, a sheet-like negative electrode 3 as an electrode, a sheet-like separator 4 and a sheet-like positive electrode 5 as an electrode are laminated in this order from a lower side, and by integrating them, mono cell 1 is formed. Moreover, in the present embodiment, a sheet-like separator 6 is bonded onto positive electrode 5, and then mono cell 1 is formed to have a four-layer structure. Negative electrode 3 is formed in a sheet-like state in such a manner that slurry made by mixing active material, a conductive auxiliary agent, binder, an organic solvent and the like is applied to both of the surfaces of current collecting foil, such as copper foil, in a predetermined thickness, and then is dried. Similarly, positive electrode 5 is formed in a sheet-like state in such a manner that slurry made by mixing active material, a conductive auxiliary agent, binder, an organic solvent and the like is applied to both of the surfaces of current collecting foil, such as aluminum foil, in a predetermined thickness, and then is dried. The thickness of negative electrode 3 is thinner than that of positive electrode 5, and the size of negative electrode 3 is larger than that of positive electrode 5. As shown in FIG. 2, negative electrode 3 is cut so as to leave a tab portion 7. On the other hand, positive electrode 5 is cut so as to leave a tab portion 8.

A rectangular electrode laminate (power generation element) is formed by laminating a plurality of mono cells 1 formed in such a manner, and a lithium ion secondary battery is formed by accommodating the electrode laminate in a laminate film exterior body which is not shown in the drawings, together with electrolyte.

Separator 4 is substantially the same as separator 6, and has a function to hold the electrolyte while suppressing the short circuit between positive electrode 5 and negative electrode 3. For example, separators 4 and 6 are each made of a microporous film of synthetic resin, such as polyethylene (PE) and polypropylene (PP), or nonwoven fabric. In addition, separators 4 and 6 are each formed lager than negative electrode 3.

As shown in FIG. 1, separator 4 having a long continuous belt-like shape is centered, and electrode lamination device 2 is provided with a pair of upper and lower conveyance rollers 9, an absorption drum 10 for the negative electrode which is positioned on the downstream side of conveyance rollers 9, a nip roller 11 positioned on the upper side of this negative electrode absorption drum 10, an absorption drum 12 for the positive electrode which is positioned on the downstream side of nip roller 11, and a nip roller 13 positioned on the lower side of positive electrode absorption drum 12.

Conveyance rollers 9 are provided for conveying separator 4 along a conveyance direction T.

Negative electrode absorption drum 10 is provided for absorbing sheet-like negative electrode 3 which had been cut to a predetermined dimension and in which adhesives 14A, 14B and 14C had been disposed in a dot-like state by a first dispenser 15, and superposing it to separator 4.

Nip roller 11 is provided for sticking negative electrode 3 on separator 4 by pressing negative electrode 3 superposed to separator 4 to negative electrode absorption drum 10.

Positive electrode absorption drum 12 absorbs sheet-like positive electrode 5 which had been cut to a predetermined dimension and in which adhesives 20A, 20B and 20C had been disposed in a dot-like state by a second dispenser 21, and superposes it to separator 4 so as to be arranged at a position corresponding to negative electrode 3.

Nip roller 13 is provided for sticking positive electrode 5 on separator 4 by pressing negative electrode 3, separator 4 and positive electrode 5, which are superposed on each other, to positive electrode absorption drum 12.

On the downstream side of nip roller 13, a third dispenser 26 is provided, and a conveyance roller 29 positioned on the downstream side of third dispenser 26 is provided, and a nip roller 40 positioned on the upper side of conveyance roller 29 is provided.

In a state in which negative electrode 3, separator 4 and positive electrode 5 are superposed on each other, third dispenser 26 disposes adhesives 25A, 25B and 25C in a dot-like state to positive electrode 5.

Conveyance roller 29 is provided for conveying negative electrode 3, separator 4 and positive electrode 5 superposed on each other and a separator 6 having a long continuous belt-like shape, which is sent from the upper side of separator 4, along conveyance direction T.

Nip roller 40 is provided for sticking separator 6 to positive electrode 5 by superposing separator 6 on positive electrode 5 equipped with adhesives 25A, 25B and 25C and pressing negative electrode 3, separator 4, positive electrode 5 and separator 6, which are laminated, to conveyance roller 29.

A separator cutter 30 is provided on the downstream side of nip roller 40. Separator cutter 30 is provided to cut separators 4 and 6 between adjacent two negative electrodes 3. By the cutting of separators 4 and 6, as shown in FIG. 2 and FIG. 3, a mono cell 1 in which negative electrode 3, separator 4, positive electrode 5 and separator 6 are integrated is formed.

In addition, in the present embodiment, conveyance direction T is a direction along short sides of negative electrode 3 and positive electrode 5 having rectangular shapes shown in FIG. 2. Each of tab portion 7 and tab portion 8 takes a posture directed to the side with respect to conveyance direction T.

Here, for the convenience of the following explanation, the direction orthogonal to conveyance direction T is defined as "width direction" of electrode lamination device 2.

In addition, in the postures of negative electrode 3 and the like shown in FIG. 3, the surface on the upper side of negative electrode 3 is defined as "upper surface 3a", and the surface on the lower side of negative electrode 3 is defined as "lower surface 3b". In the same way, the surface on the upper side of separator 4 is defined as "upper surface 4a", and the surface on the lower side of separator 4 is defined as "lower surface 4b". In the same way, the surface on the upper side of positive electrode 5 is defined as "upper surface 5a", and the surface on the lower side of positive electrode 5 is defined as "lower surface 5b". In the same way, the surface on the upper side of separator 6 is defined as "upper surface 6a", and the surface on the lower side of separator 6 is defined as "lower surface 6b".

Figure 5:
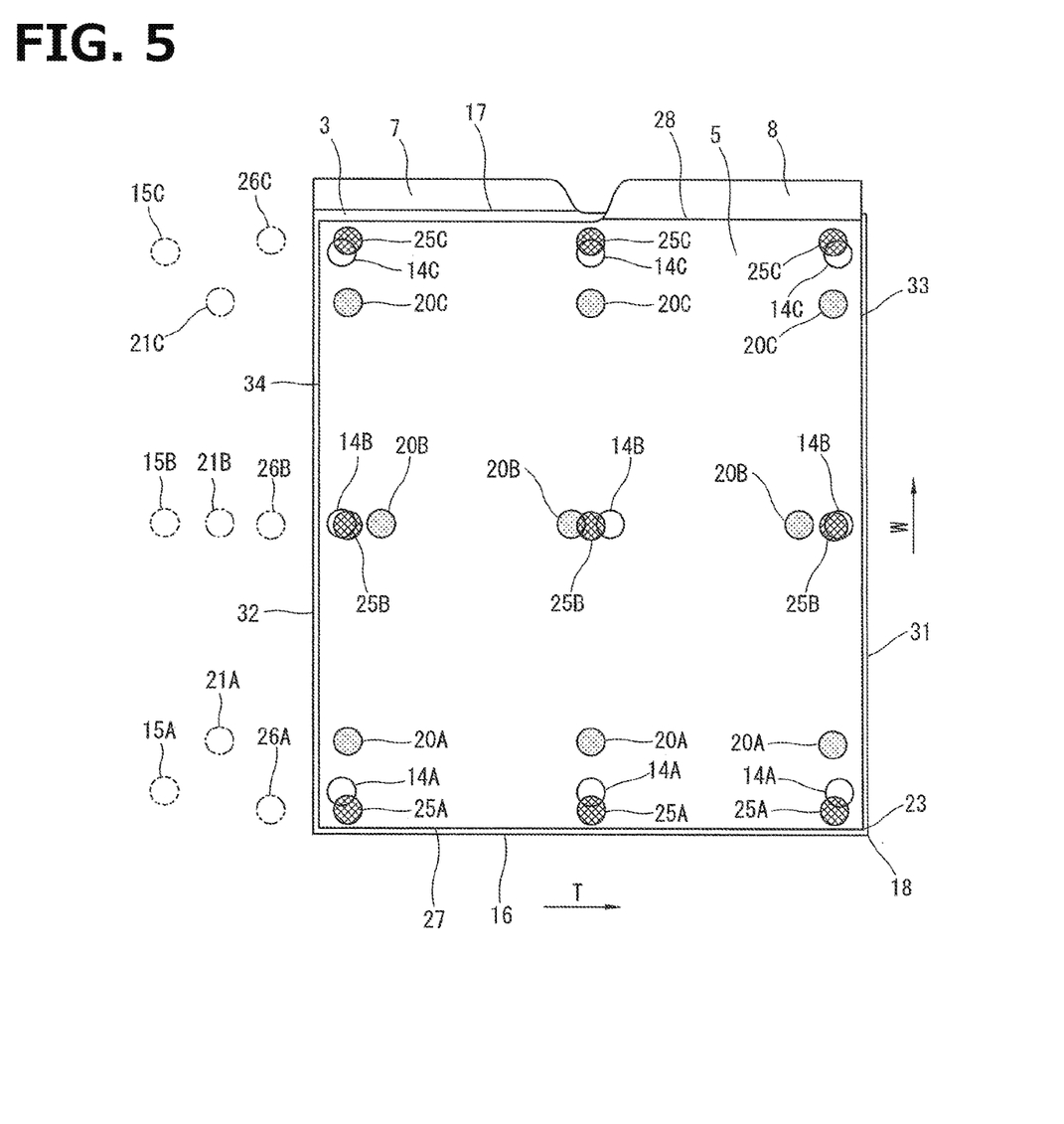
FIG. 5 is an explanatory drawing showing disposing steps and applying positions of adhesives by first, second and third dispensers.

Moreover, regarding negative electrode 3, as shown in FIG. 5, with respect to conveyance direction T, the edge portion of negative electrode 3 which becomes the downstream side is defined as "front edge 31", the edge portion of negative electrode 3 which becomes the upstream side is defined as "rear edge 32", the edge portion of negative electrode 3 which becomes the right side is defined as "right edge 16", and the edge portion (except tab portion 7) of negative electrode 3 which becomes the left side is defined as "left edge 17". In the same way, regarding positive electrode 5, as shown in FIG. 5, with respect to conveyance direction T, the edge portion of positive electrode 5 which becomes the downstream side is defined as "front edge 33", the edge portion of positive electrode 5 which becomes the upstream side is defined as "rear edge 34", the edge portion of positive electrode 5 which becomes the right side is defined as "right edge 27", and the edge portion (except tab portion 8) of positive electrode 5 which becomes the left side is defined as "left edge 28".

As shown in FIG. 1, first dispenser 15 is provided at a position facing negative electrode absorption drum 10, to bond upper surface 3a of negative electrode 3 to lower surface 4b of separator 4. First dispenser 15 is provided with three nozzles 15A, 15B and 15C for respectively disposing (applying) adhesives 14A, 14B and 14C in a dot-like state to part of upper surface 3a of negative electrode 3. Three nozzles 15A, 15B and 15C are configured in the substantially same manner, and they are provided at predetermined intervals along width direction W. Here, regarding nozzles 15A and 15C positioned on both of the sides of first dispenser 15, nozzle 15A is provided at a position at which adhesive 14A can be disposed to a position close to right edge 16 of negative electrode 3 with respect to conveyance direction T, and nozzle 15C is provided at a position at which adhesive 14C can be disposed to a position close to left edge 17 (except tab portion 7) (see FIG. 5) of negative electrode 3 with respect to conveyance direction T.

Figure 4:
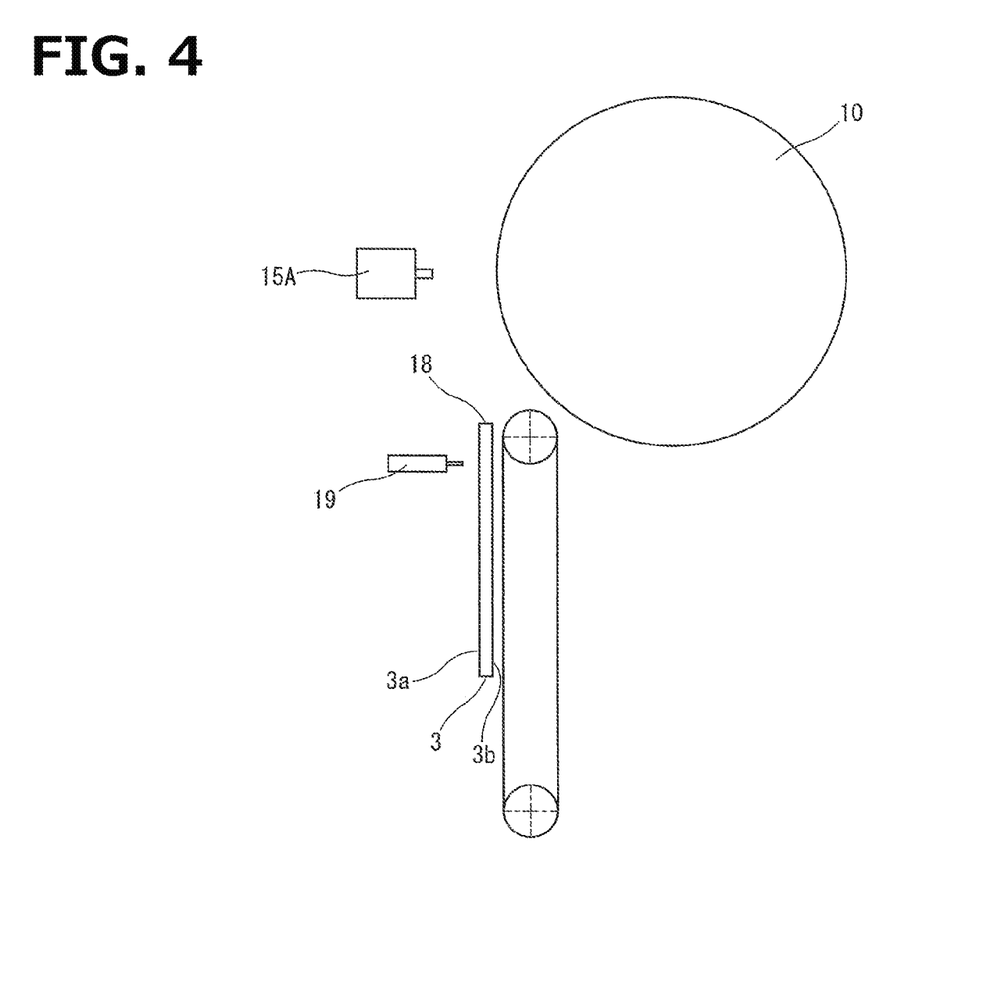
FIG. 4 is an explanatory drawing of a sensor and a nozzle of a first dispenser.

Moreover, a sensor 19 for detecting a reference position 18 of negative electrode 3 (see FIG. 5) is provided on the upstream side of first dispenser 15. In the present embodiment, reference position 18 of negative electrode 3 is the point at which front edge 31 intersects right edge 16 of negative electrode 3 (see FIG. 5). In addition, reference position 18 can be set to an arbitrary point on front edge 31. The detection of reference position 18 by sensor 19 becomes a trigger for disposing the adhesives from nozzles 15A, 15B and 15C of first dispenser 15 provided on the downstream side of sensor 19. As shown in FIG. 4, when sensor 19 detects reference position 18 of negative electrode 3 while negative electrode 3 moves, a signal for applying adhesives 14A, 14B and 14C is transmitted to first dispenser 15. Then, counting is started by a timer which is not shown in the drawings based on the signal for the application, and, after a predetermined time has elapsed, nozzles 15A, 15B and 15C of first dispenser 15 respectively dispose adhesives 14A, 14B and 14C in a dot-like state to upper surface 3a of negative electrode 3. Each of adhesives 14A, 14B and 14C from nozzles 15A, 15B and 15C is disposed at a plurality of points (three points in the embodiment) along conveyance direction T by using the counting of the timer. As illustrated in FIG. 3, the adhesives 14A, 14C of the negative electrode 3 are positioned inside of the peripheral edge portions 5C of the positive electrode 5.

In the same way, second dispenser 21 is provided at a position facing positive electrode absorption drum 12, to bond lower surface 5b of positive electrode 5 to upper surface 4a of separator 4. Second dispenser 21 is provided with three nozzles 21A, 21B and 21C for respectively disposing adhesives 20A, 20B and 20C in a dot-like state to part of lower surface 5b of positive electrode 5. Three nozzles 21A, 21B and 21C are configured in the substantially same manner, and they are provided at predetermined intervals along width direction W. Nozzle 21B positioned at the center of second dispenser 21 is provided at the same position as nozzle 15B positioned at the center of first dispenser 15 in the center in width direction W. On the other hand, nozzles 21A and 21C positioned on both of the sides of second dispenser 21 are provided more inside in width direction W than nozzles 15A and 15C positioned on both of the sides of first dispenser 15.

In addition, a sensor 24 for detecting a reference position 23 of positive electrode 5 (see FIG. 5) is provided on the upstream side of second dispenser 21. In the present embodiment, reference position 23 is the point at which front edge 33 intersects right edge 27 of positive electrode 5 (see FIG. 5). That is, reference position 23 of the embodiment is positioned at the same corner as reference position 18, when viewed in the lamination direction of mono cell 1. In addition, reference position 23 can be set to an arbitrary point on front edge 33.

Moreover, third dispenser 26 is provided on the downstream side of positive electrode absorption drum 12, to bond lower surface 6b of separator 6 to upper surface 5a of positive electrode 5. Third dispenser 26 is provided with three nozzles 26A, 26B and 26C for respectively disposing adhesives 25A, 25B and 25C in a dot-like state to part of upper surface 5a of positive electrode 5. Three nozzles 26A, 26B and 26C are configured in the substantially same manner, and they are provided at predetermined intervals along width direction W. Nozzle 26B positioned at the center of third dispenser 26 is provided at the same position as nozzle 15B positioned at the center of first dispenser 15 and nozzle 21B positioned at the center of second dispenser 21 in the center in width direction W. On the other hand, regarding nozzles 26A and 26C positioned on both sides of third dispenser 26, nozzle 26A is provided at a position at which adhesive 25A can be applied to a position closer to right edge 27 of positive electrode 5, as compared with nozzle 15A, and nozzle 26C is provided at a position at which adhesive 25C can be applied to a position closer to left edge 28 (except tab portion 8) of positive electrode 5, as compared with nozzle 15C.

In the same way as sensor 24 provided on the upstream side of second dispenser 21, a sensor 37 for detecting reference position 23 of positive electrode 5 is provided on the upstream side of third dispenser 26.

Next, with reference to FIG. 5, disposing steps and applying positions of adhesives 14A, 14B, 14C, 20A, 20B, 20C, 25A, 25B and 25C by the first, second and third dispensers 15, 21 and 26 will be explained. In FIG. 5, upper surface 3a of negative electrode 3 is bonded to lower surface 4b of separator 4 which is omitted in the drawing, and lower surface 5b of positive electrode 5 is bonded to upper surface 4a of separator 4. Accordingly, positive electrode 5 whose size is smaller than that of negative electrode 3 is laminated on negative electrode 3 through separator 4, and when viewed in the lamination direction of mono cell 1, the periphery of negative electrode 3 slightly projects from the periphery of positive electrode 5, except the tab portions 7 and 8.

In FIG. 5, adhesives 14A, 14B and 14C of first dispenser 15 are each shown by a circle, and adhesives 20A, 20B and 20C of second dispenser 21 are each shown by a circle having dots thereinside. In addition, adhesives 25A, 25B and 25C of third dispenser 26 are each shown by a circle having lattice pattern thereinside.

Moreover, in FIG. 5, there is shown the position in width direction W of each of nozzles 15A, 15B and 15C (circles drawn by broken line), nozzle 21A, 21B and 21C (circles drawn by alternate long and short dash line) and nozzles 26A, 26B and 26C (circles drawn by alternate long and two short dashes line).

Here, for the convenience for the following explanation, the side toward front edges 31 and 33 is defined as "front side", and the side toward rear edges 32 and 34 is defined as "rear side".

In the present embodiment, by nozzles 15A, 15B, 15C, 21A, 21B, 21C, 26A, 26B and 26C of the first, second and third dispensers 15, 21 and 26, adhesives 14A, 14B, 14C, 20A, 20B, 20C, 25A, 25B and 25C are each disposed three times in a dot-like state along conveyance direction T. With this, each of dispenser 15, 21 and 26 applies a total of nine adhesives.

First, by three nozzles 15A, 15B and 15C of first dispenser 15, adhesives 14A, 14B and 14C are disposed in a dot-like state on upper surface 3a of negative electrode 3. At the time of the disposing, by nozzles 15A and 15C positioned on both of the sides of first dispenser 15, adhesives 14A and 14C are disposed in a dot-like state at positions near front edge 31 of negative electrode 3, and adhesives 14A and 14C are disposed in a dot-like state at the center positions in conveyance direction T, and, moreover, adhesives 14A and 14C are disposed in a dot-like state at positions near rear edge 32 of negative electrode 3. After disposing adhesives 14A and 14C, three adhesives 14A, 14A and 14A are arranged at equal intervals along conveyance direction T at positions close to right edge 16, and three adhesives 14C, 14C and 14C are arranged at equal intervals along conveyance direction T at positions close to left edge 17 (except tab portion 7). In addition, by nozzle 15B positioned at the center of first dispenser 15, an adhesive 14B is disposed at front edge 31 of negative electrode 3, and an adhesive 14B is disposed more on the front side than adhesives 14A and 14C disposed at the center in conveyance direction T by shifting applying timing by adjusting a timer, and, moreover, an adhesive 14B is disposed near rear edge 32 of negative electrode 3. After disposing adhesives 14B, in front edge 31 and rear edge 32 sides, adhesives 14B are aligned with adhesives 14A and 14C along width direction W, and in the center in conveyance direction T, adhesive 14B is provided more on the front side than adhesives 14A and 14C.

Next, by three nozzles 21A, 21B and 21C of second dispenser 21, adhesives 20A, 20B and 20C are disposed in a dot-like state on lower surface 5b of positive electrode 5. When adhesives 20A, 20B and 20C are disposed, adhesives 20A, 20B and 20C are disposed at positions at which adhesives 20A, 20B and 20C do not overlap adhesives 14A, 14B and 14C respectively. Specifically, regarding nozzle 21A and 21C disposed on both of the sides of second dispenser 21, by providing nozzle 21A and 21C more on the inside in width direction W than nozzle 15A and 15C disposed on both of the sides of first dispenser 15, adhesives 20A and 20C are shifted more on the inside in width direction W than adhesives 14A and 14C, and regarding nozzle 21B disposed in the center of second dispenser 21, by adjusting the applying timing of adhesives 20B with a timer, adhesives 20B are shifted from adhesives 14B in conveyance direction T.

At the time of the disposing, by nozzles 21A and 21C positioned on both of the sides of second dispenser 21, adhesives 20A and 20C are disposed in a dot-like state at positions near front edge 33 of positive electrode 5, and adhesives 20A and 20C are disposed in a dot-like state at the center positions in conveyance direction T, and, moreover, adhesives 20A and 20C are disposed in a dot-like state at positions near rear edge 34 of positive electrode 5. After disposing adhesives 20A and 20C, three adhesives 20A, 20A and 20A are arranged at equal intervals along conveyance direction T at positions more on the inner side in width direction W than adhesives 14A, 14A and 14A, and three adhesives 20C, 20C and 20C are arranged at equal intervals along conveyance direction T at positions more on the inner side in width direction W than adhesives 14C, 14C and 14C. In addition, by nozzle 21B positioned at the center of second dispenser 21, an adhesive 20B is disposed in a dot-like state at a position more on the rear side than adhesive 14B on front edge 33 side, and an adhesive 20B is disposed in a dot-like state at a position more on the rear side than adhesive 14B at the center in conveyance direction T, and, moreover, an adhesive 20B is disposed in a dot-like state at a position more on the front side than adhesive 14B on rear edge 34 side. After disposing adhesives 20B, three adhesives 20B, 20B and 20B are shifted in conveyance direction T from the respective three adhesives 14B, 14B and 14B.

After disposing adhesives 20A, 20B and 20C by second dispenser 21, by three nozzles 26A, 26B and 26C of third dispenser 26, adhesives 25A, 25B and 25C are disposed in a dot-like state on upper surface 5a of positive electrode 5. At the time of the disposing, by nozzle 26B which is disposed at the center of third dispenser 26 and which is provided at the same position as center nozzles 15B and 21B in width direction W, an adhesive 25B is disposed in a dot-like state at a position near front edge 33, and an adhesive 25B is disposed in a dot-like state at the center position in conveyance direction T, and, moreover, an adhesive 25B is disposed in a dot-like state at a position near rear edge 34. After disposing adhesives 25B, three adhesives 25B are arranged at equal intervals along conveyance direction T. In addition, by nozzles 26A and 26C which are positioned on both of the sides of third dispenser 26 and which are provided more on the outside in width direction W than nozzles 15A and 15C on both of the sides of first dispenser 15 respectively, adhesives 25A and 25C are disposed in a dot-like state at positions near front edge 33, and adhesives 25A and 25C are disposed in a dot-like state at the center positions in conveyance direction T, and, moreover, adhesives 25A and 25C are disposed in a dot-like state at positions near rear edge 34. After disposing adhesives 25A and 25C, three adhesives 25A, 25A and 25A are arranged at equal intervals along conveyance direction T at positions more on the outer side in width direction W than adhesives 14A, 14A and 14A, and three adhesives 25C, 25C and 25C are arranged at equal intervals along conveyance direction T at positions more on the outer side in width direction W than adhesives 14C, 14C and 14C. In addition, three adhesives 25A, 25B and 25C are arranged at equal intervals in width direction W at each of the positions near front edge 33, the center positions in conveyance direction T and the positions near rear edge 34.

As the above, in the present embodiment, when viewed in the lamination direction of mono cell 1, the positions of adhesives 14A 14B and 14C on lower surface 4b side of separator 4 and the positions of adhesives 20A, 20B and 20C on upper surface 4a side of separator 4 do not overlap each other. When viewed in the lamination direction of mono cell 1, since adhesives 14A, 14B and 14C are not disposed at the same positions as adhesives 20A 20B and 20C on both of the surfaces of separator 4, the thickness of mono cell 1 does not excessively increase.

In addition, in the present embodiment, adhesives 14A and 14C disposed on negative electrode 3 side are disposed more on the outer side in width direction W than adhesives 20A and 20C disposed on positive electrode 5 side. Since negative electrode 3 is formed to be thinner than positive electrode 5, it tends to separate from separator 4 more easily than positive electrode 5, and by disposing adhesives 14A and 14C disposed on negative electrode 3 side on the outer side in that way, negative electrode 3 becomes hard to separate from separator 4.

Moreover, in the present embodiment, although separator 6 is easily turned up by, for example, wind because separator 6 is positioned on the uppermost side of mono cell 1, since adhesives 25A and 25C are disposed on upper surface 5a of positive electrode 5 on the outermost side in width direction W to stick lower surface 6b of separator 6 on upper surface 5a of positive electrode 5, separator 6 can be surely stuck to positive electrode 5.

In addition, in FIG. 5, although adhesive 14A and adhesive 25A, adhesive 14B and adhesive 25B, adhesive 20B and adhesive 25B, and adhesive 14C and adhesive 25C are partially overlapped with each other when viewed in the lamination direction of mono cell 1, this occurs as a result of putting on emphases on making separation of negative electrode 3 and separator 6, which are positioned on the outermost sided, hard.

In this way, in the present embodiment, adhesives 14A, 14B and 14C disposed on lower surface 4b of separator 4 and adhesives 20A, 20B and 20C disposed on upper surface 4a of separator 4 do not overlap each other. Moreover, adhesives 25A, 25B and 25C for bonding of separator 6 can be disposed at positions not overlapping them, if it is necessary.

In addition, in the present embodiment, although, as shown in FIG. 1, one which linearly conveys separator 4 has been described as an example, the configuration of a conveyance line is not limited to the configuration shown in FIG. 1.

In addition, in the present embodiment, although mono cell 1 having a four-layer structure formed of negative electrode 3, separator 4, positive electrode 5 and separator 6 has been described as an example, a mono cell having three-layer structure can be applied to the present invention.

The invention claimed is:

1. A method for manufacturing a mono cell in which a separator that is sheet-like is disposed between a positive electrode that is sheet-like and a negative electrode that is sheet-like and is formed larger than the positive electrode, the method comprising:
bonding one surface of the separator to the negative electrode through negative electrode adhesives disposed at a plurality of points on the negative electrode; and
bonding another surface of the separator to the positive electrode through positive electrode adhesives disposed at a plurality of respective points on the positive electrode,
wherein, when viewed in a lamination direction of the mono cell:
the negative electrode adhesives of the negative electrode do not overlap the positive electrode adhesives of the positive electrode;
the negative electrode adhesives disposed at peripheral edge portions of the negative electrode are positioned outside of the positive electrode adhesives disposed at peripheral edge portions of the positive electrode; and
the negative electrode adhesives of the negative electrode are positioned inside of the peripheral edge portions of the positive electrode.

2. The method for manufacturing the mono cell according to claim 1, wherein additional positive electrode adhesives are disposed at a plurality of respective points that correspond to the positive electrode adhesives disposed at the peripheral edge portions of the positive electrode but on an opposing side of the positive electrode, and the positive electrode is bonded to a sheet-like second separator.

3. The method for manufacturing the mono cell according to claim 1, wherein a first dispenser for disposing the negative electrode adhesives on the negative electrode includes a plurality of nozzles, wherein a second dispenser for disposing the positive electrode adhesives on the positive electrode includes a plurality of nozzles, and wherein the plurality of the nozzles of the first dispenser and the plurality of the nozzles of the second dispenser are arranged to be shifted with respect to each other in a direction orthogonal to a conveyance direction of the mono cell.

4. The method for manufacturing the mono cell according to claim 1, wherein a first dispenser for disposing the negative electrode adhesives on the negative electrode includes a plurality of nozzles, wherein a second dispenser for disposing the positive electrode adhesives on the positive electrode includes a plurality of nozzles, wherein the plurality of the nozzles of the first dispenser are provided at same positions as the plurality of the nozzles of the second dispenser in a direction orthogonal to a conveyance direction of the mono cell, and wherein applying timing of the positive electrode adhesives from the plurality of the nozzles of the second dispenser is shifted with respect to applying timing of the negative electrode adhesives from the plurality of the nozzles of the first dispenser.

5. The method for manufacturing the mono cell according to claim 1, wherein the positive electrode is bonded to a sheet-like second separator through additional positive electrode adhesives disposed at a plurality of points on an opposing side of the positive electrode, and wherein, when viewed in the lamination direction of the mono cell, the positive electrode adhesives between the other surface of the separator and the positive electrode, the negative electrode adhesives between the one surface of the separator and the negative electrode, and the additional positive electrode adhesives between the positive electrode and the sheet-like second separator are arranged in order toward two opposing edges of the negative electrode which are orthogonal to a conveyance direction of the mono cell.

* * * * *